Dec. 18, 1962　　　　R. J. SIROIS　　　　3,068,949
TRACTION ARM FOR VEHICLE ANTI-SKID DEVICE
Filed Oct. 19, 1959　　　　　　　　　　2 Sheets-Sheet 1
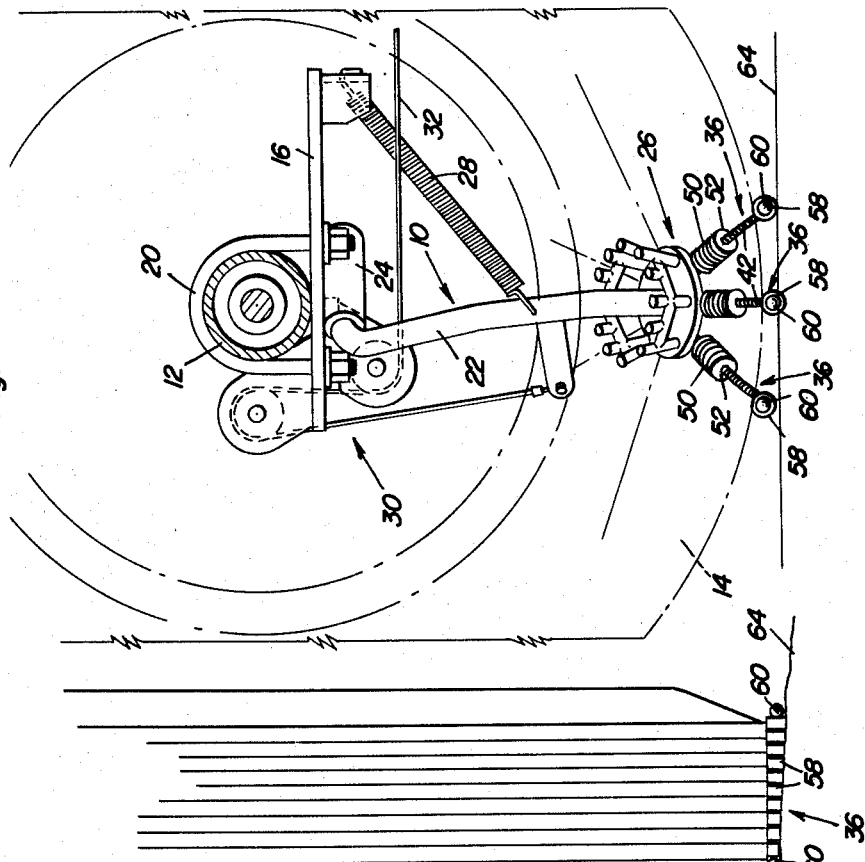
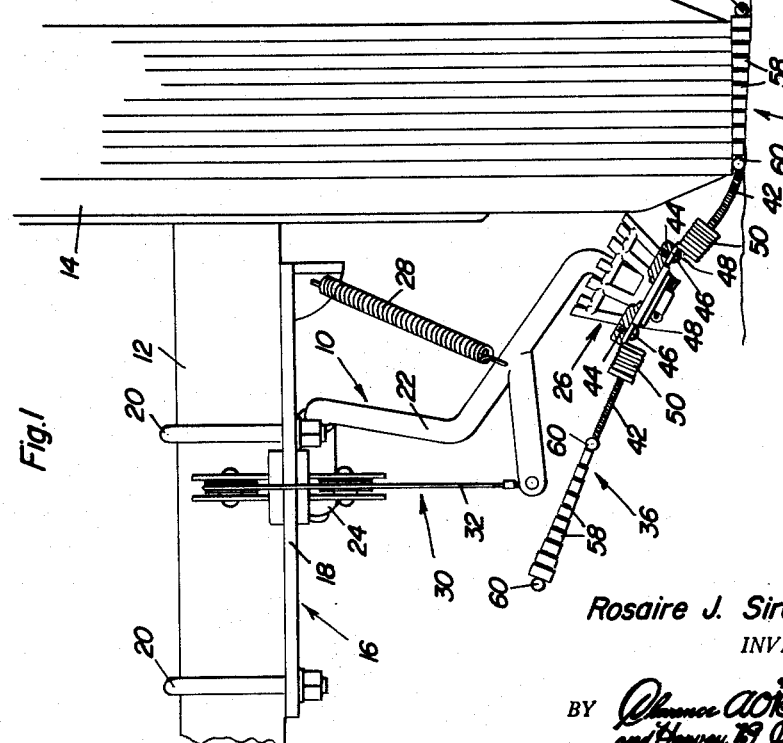
Rosaire J. Sirois
INVENTOR.
BY *Clarence A. O'Brien*
*and Harvey B. Jacobson*
Attorneys

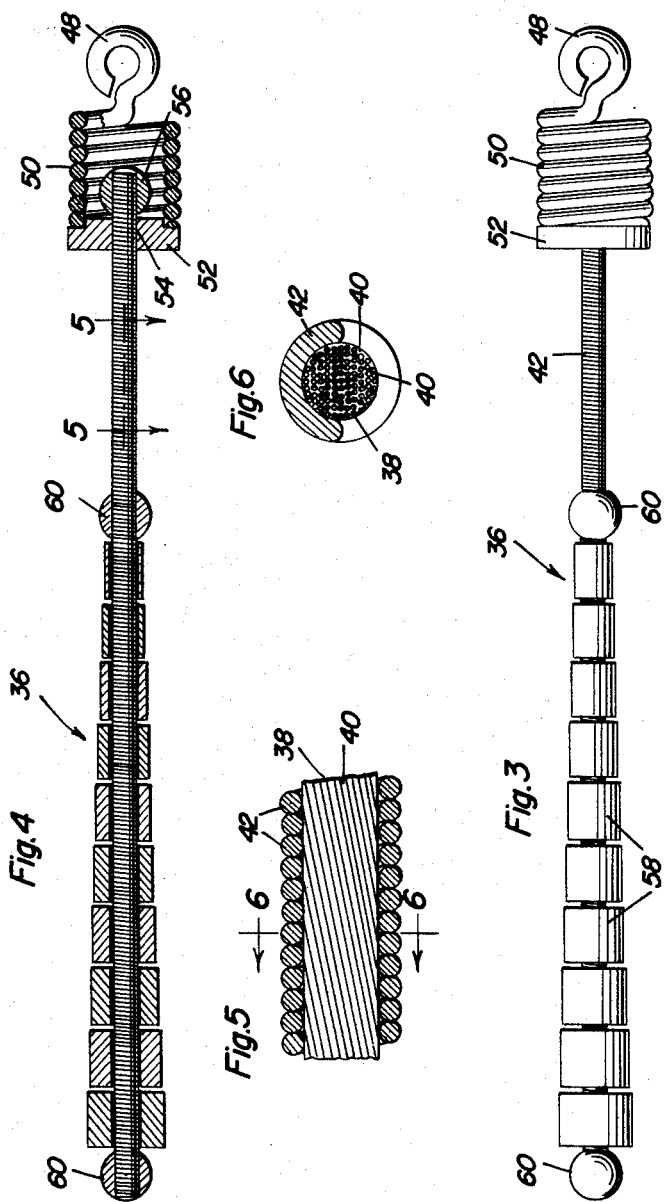

United States Patent Office 3,068,949
Patented Dec. 18, 1962

3,068,949
TRACTION ARM FOR VEHICLE
ANTI-SKID DEVICE
Rosaire J. Sirois, % Joseph I. Jacques, 30 Farmington
Ave., Hartford, Conn.
Filed Oct. 19, 1959, Ser. No. 847,339
3 Claims. (Cl. 180—1)

This invention relates to a novel and useful traction arm and more particularly to a traction arm which is specifically adapted for use in connection with vehicle anti-skid devices of the type having a hub rotatably mounted to a carrier rod which is in turn mounted for swinging movement between a retracted position remote from a vehicle traction wheel and a position adjacent the lower portion of the traction wheel, a plurality of the traction arms each having one end secured to the hub and extending radially therefrom and adapted to have their end portions remote from the hub passed between the tread of the traction wheel and its supporting surface in sequence upon rotation of the hub and the traction wheel.

The traction arms comprising the instant invention are adapted to be used in connection with automobile traction devices such as that disclosed by the patent to H. N. Ridgway, No. 2,283,948, dated May 26, 1942 in the place of the conventional traction chains whose use could have undesirable results as will be hereinafter set forth.

The main object of this invention is to provide the proper amount of semi-rigidity in the traction arms to obtain the optimum operation of the same inasmuch as linked chain traction arms will often not be thrown between the tire and its supporting surface during a starting operation.

A further object of this invention is to provide the semi-rigid or flexible traction arm with a plurality of rollers which are rotatably mounted thereon so as to reduce the cutting action of the traction arms on the treaded surface of the tire during the operation of the traction device, to also increase the riding qualities of the vehicle to which the traction device is secured and also to increase the life expectancy of the traction arm.

Still another object of this invention is to provide a means for resiliently mounting the traction arm to the rotatable hub of the traction device in order to absorb any shock during operation of the traction device which might result in the damage or breakage of the traction arms.

Yet another object of this invention is to provide the traction arm with a plurality of rollers on the end portion remote from the end which is secured to the rotatable hub, the rollers being successively larger in diameter towards the end of the traction arm remote from the rotatably mounted hub whereby a greater percentage of the weight of the traction arm will be positioned on its outer end thereby increasing the centrifugal force of the outer end of the traction arm to insure that it will be thrown between the tire and the supporting surface of the wheel of the tire during operation of the traction device.

A still further object of this invention is to provide a means for rotatably mounting the traction arm to the resilient mounting means whereby any tendency of the traction arm to bend or twist will be eliminated thereby increasing the life expectancy of the traction arm.

And a final object to be specifically enumerated herein is to provide a traction arm which will conform to conventional forms of manufacture, be of simple construction, and durable so as to provide a device which will be economically feasible, relatively troublefree, and long lasing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of a plurality of the traction arms shown mounted upon a rotatably mounted hub of an anti-skid attachment for vehicles as seen from the rear of one of the traction wheels of the vehicle;

FIGURE 2 is a side elevational view of a plurality of the traction arms as seen from the right side of FIGURE 1, the vehicle traction wheel being shown in phantom lines;

FIGURE 3 is a side elevational view of one of the traction arms;

FIGURE 4 is a vertical longitudinal sectional view taken substantially upon the longitudinal center line of the traction arm shown in FIGURE 3;

FIGURE 5 is an enlarged horizontal longitudinal sectional view taken substantially upon the plane indicated by the plane of the section line 5—5 of FIGURE 4; and FIGURE 6 is a transverse vertical sectional view taken substantially upon the plane indicated by the section line 6—6 of FIGURE 5.

With reference now more particularly to the drawings there will be seen a conventional form of vehicle anti-skid traction device generally designated by the reference numeral 10 which is secured to the axle housing 12 supporting traction wheel 14. The attachment 10 includes a bracket assembly generally designated by the reference numeral 16 which includes a mounting plate 18 secured to the axle housing 12 by means of a pair of U-bolts 20. The bracket assembly 16 has rotatably secured thereto one end of a carrier rod 22 by means of bearing 24. The carrier rod 22 has rotatably journaled on its other end a hub generally designated by the reference numeral 26.

It is to be understood that the carrier rod 22 is swingable from a retracted position (not shown) remote from the traction wheel 14 to an operational position adjacent the traction wheel 14 as shown in FIGURES 1 and 2. Further, expansion spring 28 is secured to the carrier rod 22 intermediate its ends at one end and is secured to the bracket assembly 16 at its other end to yieldably urge the carrier rod 22 towards an operational position adjacent the traction wheel 14.

An operating control generally designated by the reference numeral 30 which includes a flexible cable 32 is also secured to the carrier rod 22 for moving the carrier rod 22 towards an inoperational position and retaining the carrier rod 22 in that inoperational position. It is to be understood that the flexible cable 32 may terminate at a point adjacent the driver of a vehicle (not shown) so that the same may be manipulated at the driver's will to retract the traction device to an inoperational position if it is desired.

With attention now directed more particularly to FIGURES 3 through 6 of the drawings it will be noted that the traction arm is generally designated by the reference numeral 36 and that it comprises a length of cable 38 comprised of a plurality of twisted strands 40 of metallic wire. The cable 38 has wound tightly thereabout integral convolutions 42 of spring steel in order to increase the resiliency of the traction arm 36.

Each traction arm 36 is resiliently secured to the hub 26 and extends radially therefrom. The hub 26 is provided with a plurality of circumferentially spaced threaded apertures 44 which are adapted to threadingly receive fasteners 46 which are passed through the closed loop 48 formed on one end of mounting spring 50.

The mounting spring 50 comprises an expansion spring having the closed loop 48 formed integrally with the end convolution on one end of the spring. The other end of expansion spring 50 has fixedly secured thereto by any convenient means such as brazing or welding a mounting disk 52 having a centrally disposed aperture 54 formed therein.

One end of the cable 38 is slidably and rotatably received through the aperture 54 and that end of the cable 38 has a ball stop 56 fixedly secured thereto in any convenient manner preventing the retraction of that end of the cable 38 through the aperture 54, the ball stop 56 being larger in diameter than the aperture 54.

The end portion of the cable 38 remote from spring 50 has rotatably journaled thereon a plurality of rollers 58. The rollers 58 are retained in side-by-side relation along the cable 38 by means of ball stops 60 which are fixedly secured to the convolutions 42 in any convenient manner at a spaced distance from each other sufficient to enable the placement of the desired number of rollers 58 therebetween. There are ten rollers 58 disclosed in the drawings and it is to be noted that any desired number of rollers may be provided in addition to any desired length of cable 38 in order to assure that the traction arm 36 will have a sufficient number of rollers 58 to span the width of the tread of a vehicle tire. Further, it will be noted that the rollers 58 increase in diameter successively so that the innermost roller 58 adjacent the coil spring 50 is the smallest with each successive outwardly positioned roller being larger in diameter than the preceding roller.

With particular attention now directed to FIGURE 1 of the drawings it will be noted that the flexible cable 38 may flex laterally of its longitudinal axis in order to be positioned beneath the traction wheel 14 of a vehicle. Further, in operation, tension is released on the flexible cable 32 which enables the expansion spring 28 to urge the carrier rod towards the operational position which positions the hub 26 adjacent the lower portion of the traction wheel 14. Then, upon the initial rotation of the traction wheel 14 the rollers 58 will be rolled beneath the traction wheel 14 thereby rotating the hub 26 and positioning the next traction arm 36 in position to pass between the traction wheel 14 and the supporting surface 64. It is to be understood that the resiliency of the cable 38 not only enables the traction arm 36 to encounter obstacles such as rocks and/or holes without incurring damage thereto, but also enables that portion of the traction arm to conform to the contour of the supporting surface 64. Further, by providing successively larger diameter rollers towards the free end of the traction arm 36, the centrifugal force of the spinning traction arms insures proper placement of the traction arm between the traction wheel 14 and the supporting surface 64.

The coil spring 50 not only enables the traction arm 36 to be laterally deflected relative to its normal position but also enables a certain degree of resiliency with respect to the length of the traction arm 36 thereby greatly reducing wear upon the traction arm 36 and the traction wheel 14.

The foregoing is considered as illustrative only of the principles of the invention. Furthermore since numerous modifications and changes will readily occur to those skilled in the art, it is not desired to limit the invention to the exact construction and operation shown and described, and accordingly, all suitable modifications and equivalents may be restored to, falling within the scope of the invention as claimed.

What is claimed as new is as follows:

1. A traction arm for a vehicle anti-skid device of the type having a hub rotatably mounted on a carrier rod, said rod being mounted for swinging movement between a retracted position remote from a vehicle traction wheel and a position adjacent the lower portion of the traction wheel, a plurality of traction arms resiliently mounted on said hub, each arm having means rotatably carried on one end adapted for securement to said hub with the other end extending radially and resiliently therefrom and adapted to have its end portion remote from said hub passed between the tread of the traction wheel and its supporting surface in sequence upon rotation of said hub, each traction arm comprising an elongated flexible and resilient member resiliently attached to said hub, a plurality of rollers of successively increasing diameter thereon at the outer ends thereof, means journaling said rollers on the ends of arms remote from said hub in side-by-side relation, and spaced stops on each arm retaining said rollers against more than limited movement longitudinally of said end portion.

2. The combination of claim 1 wherein said means rotatably carried by said one end of said flexible member includes a coiled expansion spring having an integral loop eye formed on one end for securement to said hub, an apertured mounting disk fixedly secured to said other end of said coiled spring, said one end of said cable being slidably and rotatably received through said aperture, and retaining means secured to said one end of said cable preventing its retraction through said aperture.

3. The combination of claim 2 wherein said flexible member comprises a cable including a plurality of twisted wire strands, said cable having tightly wound therearound integral convolutions of spring steel.

References Cited in the file of this patent
UNITED STATES PATENTS

| | | |
|---|---|---|
| 1,554,313 | Warren et al. | Sept. 22, 1925 |
| 2,241,923 | Ridgway | May 13, 1941 |
| 2,589,207 | Welsh | Mar. 11, 1952 |
| 2,815,828 | Schaefer | Dec. 10, 1957 |
| 2,886,138 | Bruner | May 12, 1959 |

FOREIGN PATENTS

| | | |
|---|---|---|
| 190,502 | Great Britain | Dec. 28, 1922 |